(12) United States Patent
Atzmon et al.

(10) Patent No.: US 12,366,631 B1
(45) Date of Patent: Jul. 22, 2025

(54) SOFTWARE-DEFINED GaN-BASED UTILITY LOCATOR TRANSMITTER

(71) Applicant: Exodigo Ltd., Tel Aviv (IL)

(72) Inventors: Ron Atzmon, Tel Aviv (IL); Arad Eizen, Rishon LeZion (IL); Guy Inbar, Tel Aviv (IL)

(73) Assignee: Exodigo Ltd., Tel Aviv (IL)

( * ) Notice: Subject to any disclaimer, the term of this patent is extended or adjusted under 35 U.S.C. 154(b) by 0 days.

(21) Appl. No.: 19/096,842

(22) Filed: Apr. 1, 2025

(51) Int. Cl.
*G01V 3/12* (2006.01)
*G01S 5/14* (2006.01)
*H01Q 1/22* (2006.01)

(52) U.S. Cl.
CPC ............ *G01S 5/14* (2013.01); *G01V 3/12* (2013.01); *H01Q 1/22* (2013.01)

(58) Field of Classification Search
CPC .................................... G01V 3/12; H01Q 1/22
USPC ........................................................ 342/350
See application file for complete search history.

(56) References Cited

U.S. PATENT DOCUMENTS

| | | |
|---|---|---|
| 8,013,610 B1 | 9/2011 | Merewether et al. |
| 11,693,145 B1 | 7/2023 | Halvani et al. |
| 11,828,898 B1 | 11/2023 | Eizen et al. |
| 2014/0191759 A1 | 7/2014 | Olsson et al. |

FOREIGN PATENT DOCUMENTS

| | | | | |
|---|---|---|---|---|
| CN | 109507739 A | * | 3/2019 | ............... G01V 3/12 |
| CN | 117471235 | | 1/2024 | |
| WO | WO-2006057887 A1 | * | 6/2006 | ......... G08B 13/2411 |
| WO | WO 2013/074705 | | 5/2013 | |
| WO | WO-2017109446 A1 | * | 6/2017 | ......... C01B 13/0207 |
| WO | WO-2021061194 A1 | * | 4/2021 | ......... G01R 19/2509 |

* cited by examiner

*Primary Examiner* — Harry K Liu

(57) ABSTRACT

The present invention pertains to a software-defined, multi-frequency utility locating transmitter utilizing GaN-based switching technology for enhanced signal control and efficiency. The transmitter features a high-frequency H-bridge driving a low-impedance air-coil antenna to emit multi-frequency continuous waves. A control unit dynamically adjusts frequency, amplitude, and power based on real-time feedback, enabling signal correction and interference mitigation via real-time spectrum analysis by software means.

13 Claims, 4 Drawing Sheets

SOFTWARE-DEFINED GaN-BASED UTILITY LOCATOR TRANSMITTER

FIELD AND BACKGROUND OF THE INVENTION

The present invention relates, in some embodiments thereof, to detecting underground utilities and, more specifically, but not exclusively, to detecting underground utilities using wideband electromagnetic sensors and multifrequency self-adjusting transmitters.

Detecting underground utilities, for example, electric cables, telecommunication and data cables, water and sewer pipelines, gas and oil pipelines, and/or the like is a critical process in many industries, including construction, telecommunications, and energy. Accidental damage to underground utilities may cause serious safety hazards, significant financial losses, and disruptions to essential services.

However, the detection of underground utilities has historically been a challenging and time-consuming process. Conventional methods for detecting underground utilities include manual excavation, ground-penetrating radar, and electromagnetic induction. Such methods may have major inherent limitations, including the need for large equipment, limited depth penetration, and poor accuracy in certain soil conditions. In addition, conventional methods can be expensive, time-consuming, and disruptive to surrounding areas.

Recent developments in electromagnetic technology have led to the development of more advanced utility detection systems utilizing electromagnetic signals to detect the presence of a wider range of underground utilities in a range of soil conditions with higher accuracy and reliability.

In the field of underground utility detection, various systems have been developed to enhance accuracy and usability. Some systems generate multiple frequencies simultaneously to detect utilities with different resonant frequencies. Others employ multi-frequency techniques to mitigate interference from nearby metallic objects or electromagnetic sources, potentially differentiating between target utility and unwanted signals and improving locator accuracy. Furthermore, advancements in antenna design for multi-frequency transmitters have been made, optimizing transmission and reception to enhance range and sensitivity. Innovations in transmitter design have also been introduced, focusing on portability and user-friendliness through compact size, rugged construction, and intuitive interfaces. However, existing solutions require a considerable time and effort to perform mapping of underground utilities present over large areas.

SUMMARY OF THE INVENTION

An objective of the embodiments of the disclosure is to provide a solution for detecting underground utilities which mitigates or solves the drawbacks and problems of conventional solutions. For example, existing solutions do not address direct transmission without impedance-matching capacitors or current resonators. The above and further objectives are solved by the subject matter of the independent claims. Further advantageous embodiments can be found in the dependent claims.

As used herein, the term "GaN" means "gallium nitride".

The present invention provides a novel GaN-based high-frequency transmitter system that enables simultaneous multi-frequency transmission while dynamically adapting to environmental conditions. Unlike traditional transmitters that rely on fixed-frequency LC resonance circuits for frequency tuning, the disclosed system employs a GaN-based H-bridge switching architecture, which enhances the adaptability of the transmitted waveform as well as significantly reduces manufacturing and calibration complexity. The integration of real-time feedback mechanisms allows the system to compensate for impedance mismatches, providing more stable and accurate underground utility detection.

According to an aspect of some embodiments of the present invention there is provided a transmitter for underground metal object detection system, comprising one of (1) a high-frequency H-bridge and (2) a pair of high-frequency half H-bridges, a transmitting antenna, wherein the one of (1) a high-frequency H-bridge and (2) a pair of high-frequency half H-bridges provides an alternating current to the transmitting antenna, and a processor configured to perform the following: receive a plurality of signal parameters, wherein a signal parameter comprises one or more frequency values and one or more amplitude values; generate a high-frequency modulated control signal controlling the one of (1) a high-frequency H-bridge and (2) a pair of high-frequency half H-bridges to produce the alternating current in accordance to the plurality of signal parameters, thereby transmitting a multi-frequency radio signal via the transmitting antenna; measure the alternating current to make a determination whether the modulated control signal conforms to the plurality of signal parameters; and responsive to determining that the modulated control signal does not conform to the plurality of signal parameters, adjust the plurality of signal parameters.

Optionally, the one of (1) a high-frequency H-bridge and (2) a pair of high-frequency half H-bridges operates at a frequency of 200 kHz to 12 MHz, and the alternating current voltage is in a range of 12 VAC to 1200 VAC.

Optionally, the one of (1) a high-frequency H-bridge and (2) a pair of high-frequency half H-bridges comprises one of a plurality of GaN switching elements and a plurality of silicon carbide switching elements.

Optionally, the transmitter further comprises a power source and a DC-DC boost converter, wherein the power source output is the DC-DC boost converter input, wherein the DC-DC boost converter output is the H-bridge input, and wherein the processor is further configured to perform the following: monitor an input voltage of the DC-DC boost converter and limit power consumption of the system.

According to an aspect of some embodiments of the present invention there is provided a system for underground metal object detection, comprising a radio frequency transceiver unit; a management unit; and a plurality of transmitters, wherein the management unit is configured to send to each of the plurality of transmitters a unique plurality of signal parameters, such that all transmitters operate at frequencies at least 1 Hz apart, and wherein the transceiver unit is configured to receive and process signals transmitted by the plurality of transmitters.

According to an aspect of some embodiments of the present invention there is provided a system for underground metal object detection, comprising one or more transmitters, each transmitter comprising one of (1) a high-frequency H-bridge and (2) a pair of high-frequency half H-bridges, a transmitting antenna, wherein the one of (1) a high-frequency H-bridge and (2) a pair of high-frequency half H-bridges provides an alternating current to the transmitting antenna, a GNSS receiver, and a processor configured to perform the following: receive a respective plurality of signal parameters, wherein a signal parameter comprises one or more frequency values and one or more amplitude values, generate a high-frequency modulated control signal controlling the one of (1) a high-frequency H-bridge and (2) a pair of high-frequency half H-bridges to produce the alternating current in accordance to the plurality of signal parameters, thereby transmitting a multi-frequency radio signal via the transmitting antenna, measure the alternating current to make a determination whether the modulated control signal conforms to the respective plurality of signal parameters, responsive to determining that the modulated control signal does not conform to the respective plurality of signal parameters, adjust the respective plurality of signal parameters, and a scanning device, comprising: a GNSS receiver, a processor configured to perform the following: receive a respective GNSS position of each of the one or more transmitters, configure a plurality of signal parameters, wherein a signal parameter comprises one or more frequency values and one or more amplitude values.

According to an aspect of some embodiments of the present invention there is provided a processor-implemented method for underground metal object detection with a scanning device and one or more transmitters, comprising, determining, at the scanning device and at each of the one or more transmitters, a respective GNSS position, receiving, at the scanning device, a respective GNSS position of each of the one or more transmitters, configuring, at the scanning device, a plurality of signal parameters, wherein a signal parameter comprises one or more frequency values and one or more amplitude values, receiving, at each of the one or more transmitters, a respective plurality of signal parameters, generating, at each of the one or more transmitters, a high-frequency modulated control signal controlling one of (1) a high-frequency H-bridge and (2) a pair of high-frequency half H-bridges in accordance to the plurality of signal parameters, measuring, at each of the one or more transmitters, an alternating current provided by the one of (1) a high-frequency H-bridge and (2) a pair of high-frequency half H-bridges to a transmitting antenna to make a determination whether the modulated control signal conforms to the respective plurality of signal parameters, and responsive to determining, at each of the one or more transmitters, that the modulated control signal does not conform to the respective plurality of signal parameters, adjusting the respective plurality of signal parameters.

Optionally, generating the high-frequency modulated control signal comprises generating a multi-frequency continuous wave.

Optionally, the method further comprises at least one of performing power control of the high-frequency modulated control signal and performing frequency control of the high-frequency modulated control signal.

Optionally, the method further comprises performing digital pre-distortion of the high-frequency modulated control signal to compensate for transmission non-linearities.

Optionally, the method further comprises performing cognitive interference mitigation by dynamically adjusting the signal parameters based on detected interference.

Optionally, receiving a plurality of signal parameters comprises receiving input entered by an operator via a user interface.

Optionally, receiving a plurality of signal parameters comprises receiving input via wireless communication means.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings.

DESCRIPTION OF SPECIFIC EMBODIMENTS OF THE INVENTION

Figure 1:
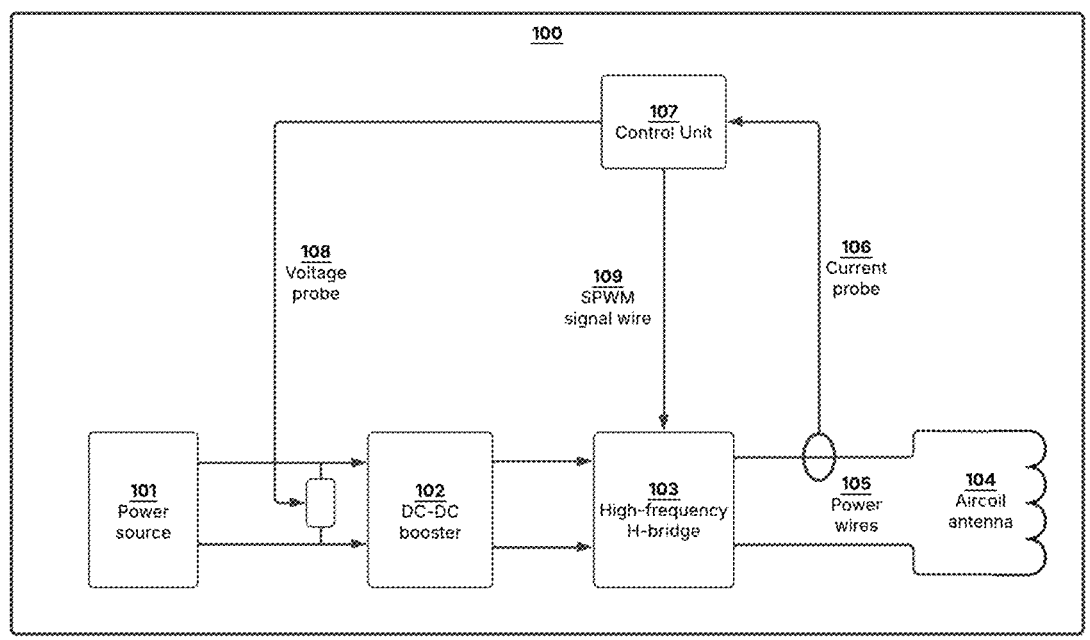
FIG. 1 is a schematic illustration of the transmitter's structure, according to some embodiments of the invention.

The present invention relates, in some embodiments thereof, to detecting underground utilities and, more specifically, but not exclusively, to detecting underground utilities using wideband electromagnetic sensors and frequency self-adjusting transmitters.

According to some embodiments of the present invention, there are provided methods, systems and computer program products for detecting underground utilities and/or objects buried in the ground in a certain area, for example, electric cables, telecommunication and data cables, water and sewer pipelines, gas and oil pipelines, and/or the like.

One or more transmitters may be deployed to transmit electromagnetic signals into the ground at the certain area in attempt to excite one or more buried underground utilities and induce an alternating current therein. In response to the electromagnetic signals transmitted by each transmitter, the excited underground utilities may emit electromagnetic radiation which may be captured by one or more electromagnetic sensors. Different underground utilities may respond differently to different frequencies; therefore, a transmitter may be adapted to transmit electromagnetic signals at different frequencies, enabling detection of different underground utilities.

The captured electromagnetic radiation may be then analyzed to detect one or more underground utilities buried in the ground in the certain area and optionally map them, for example, compute their location (e.g., geolocation, position, orientation, depth, etc.), portray them in a map (map, chart, illustration, picture, etc.) of the area and/or the like.

Each transmitter may be adapted to maintain transmission power of its transmitted electromagnetic signals at a desired frequency in order to compensate for external impedance effects and maintain the transmission power above a certain threshold in order to ensure that the electromagnetic radiation emitted by the excited underground utilities is sufficient for efficient detection by the one or more electromagnetic sensors.

A common way to perform detection different underground utilities taught by the prior art is to operate a transmitter at different frequencies sequentially, for example, by utilizing an LC resonance circuit and a capacitor bank. Solutions in the prior art rely on transmitting only at one frequency at a given time, requiring an operator to know the type of utility being investigated to select an appropriate frequency or to resort to trial and error to determine one, thereby considerably driving up the required operational time. To remedy this, some solutions in the prior art may rely on utilizing multiple transmitters to transmit electromagnetic signals at multiple frequencies simultaneously, thereby considerably driving up hardware costs.

In contrast, according to one of the methods disclosed in the present application, each transmitter may operate on a plurality of frequencies simultaneously, thereby reducing the number of transmitters required to map an area and simplifying an operator's workload.

The transmitter disclosed in the present application operates based on the generation of a software-defined multi-frequency continuous wave utilizing a high-frequency GaN H-bridge architecture. GaN-based switches and integrated half-bridges with drivers represent relatively recent advancements in power electronics. While such components are known and have been implemented in fields such as motor control, wireless power transfer, and high-frequency communication systems, they have not been applied to low-frequency utility locating transmitters. The implementation of GaN-based technology in this domain presents unique challenges and necessitates a novel approach, as existing designs and configurations are not suited for the specific requirements of low-frequency utility location applications. The present disclosure addresses these challenges and introduces a previously unutilized configuration optimized for this purpose.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Referring now to the drawings, FIG. 1 schematically illustrates the structure of a transmitter 100.

As used herein, the term "DC" means "direct current", the term "AC" means "alternating current", the term "CW" means "continuous wave", and the term "SPWM" means "sinusoidal pulse width modulation".

According to some embodiments of the invention, a DC power source 101 provides a low-voltage DC, for example 12V, to a DC-DC booster 102. The DC-DC booster 102 steps up the voltage to a higher level, for example 55V, and delivers it to a high-frequency H-bridge 103. The H-bridge 103 converts the boosted DC voltage into a high-frequency modulated alternating signal at a high voltage, for example, 110V. The alternating signal is then transmitted via power wires 105 to the aircoil antenna 104, enabling generation of a controlled electromagnetic signal for utility location.

Optionally, a control unit 107 is configured to generate a high-frequency (for example, 1 MHz) SPWM control signal via an SPWM signal wire 109 to regulate the operation of the H-bridge 103.

Optionally, the control unit 107 monitors the AC driving the aircoil antenna 104 using a current probe 106 and may dynamically adjust the control signal based on feedback.

Optionally, generating the high-frequency modulated alternating signal comprises generating a multi-frequency CW, enabling a simultaneous transmission of multiple frequency components.

Optionally, the control unit 107 monitors the input voltage provided by the DC power source 101 via a voltage probe 108 and limits power consumption of the transmitter 100 to maintain stable operation.

Optionally, the high-frequency H-bridge 103 comprises a plurality of GaN-based switching elements and a dedicated H-bridge driver configured to control their operation.

Optionally, the high-frequency H-bridge 103 comprises two high-frequency half-bridges, each half-bridge comprising a plurality of GaN-based switching elements and a dedicated half-bridge driver for independent control.

As used herein, the term "SiC" means "silicon carbide".

Optionally, the high-frequency H-bridge 103 comprises a plurality of SiC-based switching elements and a dedicated H-bridge driver configured to control their operation.

Optionally, the high-frequency H-bridge 103 comprises two high-frequency half-bridges, each half-bridge comprising a plurality of SiC-based switching elements and a dedicated half-bridge driver for independent control.

Optionally, the high-frequency H-bridge 103 operates at a frequency of 200 kHz to 12 MHz.

Optionally, the high-frequency H-bridge 103 generates an alternating signal of a voltage of 12 VAC to 1200 VAC.

Optionally, the transmitter 100 comprises a global navigational satellite system (GNSS) receiver, and may utilize the GNSS receiver to acquire information on its location.

Optionally, the control unit 107 further performs digital pre-distortion (DPD) to compensate for transmission non-linearities. Digital pre-distortion techniques enable correction of signal distortions introduced by non-idealities in the transmission chain, including amplifier non-linearity, switching imperfections, and antenna characteristics. By applying pre-distortion to the transmitted signal, control unit 107 ensures that the emitted signal maintains high fidelity, thereby improving spectral purity and reducing undesired harmonics.

The GaN-based high-frequency switching circuit provides a uniquely suitable environment for implementing DPD, as its high-speed operation reduces inherent distortions that typically affect traditional transmitter architectures. Additionally, the real-time spectral feedback mechanism enables continuous monitoring of transmitted waveforms, allowing DPD algorithms to dynamically adjust correction parameters in response to real-time deviations.

For example, responsive to a power amplifier exhibiting gain compression at high output levels, the control unit 107 may apply inverse gain expansion to compensate. Similarly, responsive to the control unit 107 detecting a harmonic distortion due to switching characteristics, the control unit 107 may utilize a DPD algorithm to adjust the pre-transmission signal to minimize undesired harmonics.

Optionally, the transmitter 100 as described hereinabove, may be implemented as a transceiver or any other type of radio frequency (RF) module. In such embodiments, transmitter 100 may include the necessary receiver circuitry and additional components to support bidirectional communication and other RF functionalities, such as frequency hopping, signal processing, or adaptive modulation. The term "transmitter" as used herein is intended to encompass any such RF module, including transceivers and other devices that perform both transmission and reception of radio signals, without limiting the scope of the invention.

Alternative correction techniques, such as adaptive equalization or machine-learning-based waveform optimization, may also be implemented within the system.

The present invention offers several notable advantages and improvements over the art. Unlike conventional hardware-defined transmitters relying a on fixed frequency selection and rigid power configurations, the present system achieves multi-mode transmission through a single hardware setup. The present invention enables advanced waveform generation by utilizing GaN's high switching frequency and linearity, allowing for precise digital control of complex waveforms, and facilitates seamless adaptation to different modulation schemes without requiring physical modifications. The application of SPWM at high carrier frequencies, combined with digital filtering, results in a multi-frequency transmission scheme that may be finely tuned to the characteristics of the aircoil antenna and ensure operational flexibility in scenarios when varying frequencies may be necessary to optimize detection accuracy under different conditions such as different regulatory and operational requirements. The rapid switching capability of GaN further facilitates real-time digital pre-distortion, which compensates for inherent nonlinearities and ensures high-fidelity signal transmission, and enables support for cognitive interference mitigation, whereby real-time signal processing algorithms detect and dynamically avoid electromagnetic interference.

The system described hereinabove is particularly useful for improving transmitter efficiency through the implementation of an aircoil antenna in place of conventional ferrite-core designs. Aircoil antennas offer several advantages, including the elimination of core losses associated with ferrite materials, resulting in a lighter and more energy-efficient transmitter. Additionally, aircoil antennas exhibit lower impedance than their ferrite-core counterparts, enabling operation at lower driving voltages. This not only reduces component costs but also mitigates the risk of electrical short circuits. Furthermore, the absence of an LC resonance circuit enhances the system's regulation stability by flattening the impedance-frequency response curve, thereby improving control margins. The linear relationship between inductance variation and current as well as support for operation-time amplitude and frequency correction further eliminates the need for manufacturing-time calibration and operation-time recalibration, simplifying deployment and reducing long-term maintenance requirements.

Figure 2:
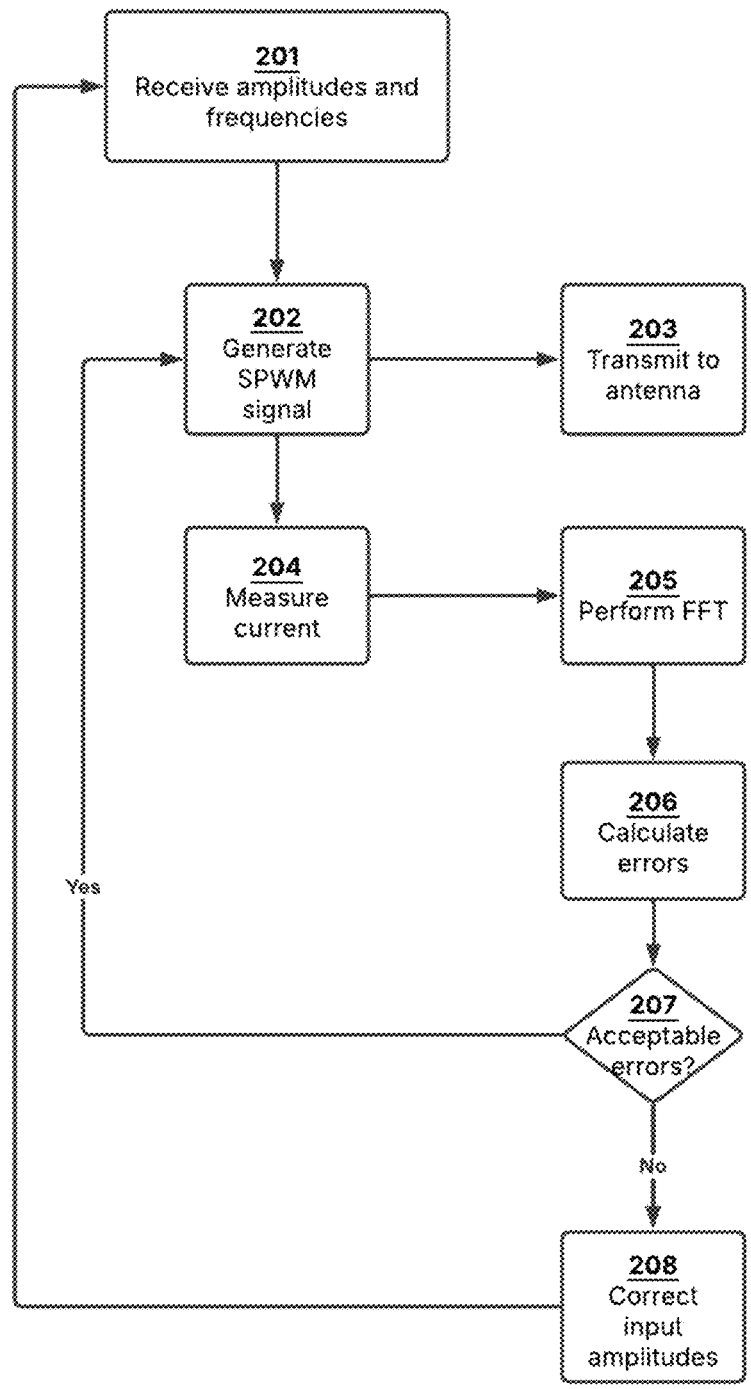
FIG. 2 is a flowchart of the transmitter's operational algorithm, according to some embodiments of the invention.

Reference is now made to FIG. 2, illustrating a flowchart of the transmitter's operational algorithm. According to some embodiments of the invention, the control unit 107 is configured to receive a plurality of signal parameters. A signal parameter defines the desired amplitude of the radio transmission emitted by aircoil antenna 104 at a respective frequency. The plurality of signal parameters may be provided manually by a human operator (for example, via a graphical user interface or a command line interface) or determined automatically by a machine intelligence instance based on predefined conditions and system requirements.

In an embodiment, a continuous feedback mechanism is employed to determine whether the modulated control signal conforms to the received plurality of signal parameters, and to maintain signal accuracy and stability. For example, conformance may be determined based on predefined relative or absolute thresholds, such as frequency deviation of at most ±0.001% from the specified frequency, or amplitude deviation of at most ±5% from the specified amplitude, respectively. The process proceeds through the following steps.

At step 201, the control unit 107 receives a plurality of signal parameters, each signal parameter comprising at least one frequency value and at least one respective amplitude value. Next, the process proceeds to a step 202.

Optionally, the control unit 107 receives 201 the plurality of signal parameters wirelessly using communication technologies such as RF transmission (e.g., Bluetooth, Wi-Fi, Zigbee, LoRa), optical communication (e.g., infrared, Li-Fi, laser-based signaling), or near-field communication (NFC).

Optionally, the control unit 107 receives 201 the plurality of signal parameters over a wired connection, such as via Ethernet, USB, serial communication (e.g., RS-232, RS-485), or other data transmission interfaces.

Optionally, the control unit 107 utilizes the received plurality of signal parameters to generate the SPWM control signal, which regulates the operation of H-bridge 103, thereby configuring the H-bridge 103 to drive the antenna 104 to transmit a multi-frequency radio wave according to the received signal parameters.

At the step 202, the control unit 107 generates an SPWM control signal based on the received plurality of control parameters. The SPWM signal regulates the operation of an H-bridge 103, thereby configuring the H-bridge 103 to drive 203 an aircoil antenna 104 to transmit a multi-frequency radio wave in accordance with the received signal parameters.

Optionally, configuring the H-bridge 103 to drive 203 an aircoil antenna 104 comprises at least one of: performing power control of the high-frequency modulated control signal and performing frequency control of the high-frequency modulated control signal. Power control may be achieved by dynamically adjusting the amplitude of the signal in response to environmental conditions, regulatory constraints, or operational requirements. Frequency control may involve real-time adjustments of the transmission frequency to accommodate impedance variations, optimize signal propagation, or comply with specific frequency allocation constraints. Next, the process proceeds to a step 204.

At the step 204, the control unit 107 measures via a current sensor 106 an AC waveform supplied to the aircoil antenna 104. Next, the process proceeds to a step 205.

At the step 205, the control unit 107 performs a spectral analysis of the measured AC waveform through a Fast Fourier Transform (FFT) process, thereby extracting frequency and amplitude components. Next, the process proceeds to a step 206.

At the step 206, the control unit 107 calculates a deviation between the expected and actual radio transmission parameters based on the extracted frequency and amplitude components. Next, the process proceeds to a decision step 207.

At the decision step 207, the control unit 107 makes a determination of whether the calculated deviation is within a predetermined threshold or a plurality thereof. If the calculated deviation is within the predetermined threshold or a plurality thereof, the process returns to the step 201. If the calculated deviation is outside of the predetermined threshold or a plurality thereof, the process proceeds to a step 208.

At the step 208, the control unit 107 adjusts the signal parameters to compensate for impedance variations caused by ground-induced reflections.

Optionally, the control unit 107 transmits the adjusted signal parameters back to a human operator or a machine intelligence instance using wired or wireless communication for further display or processing.

Figure 3:
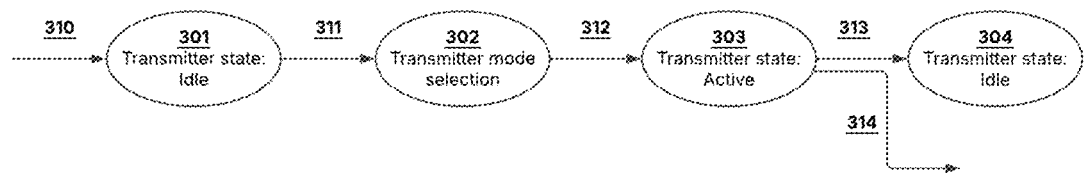
FIG. 3 is a state transition flowchart of the presently disclosed transmitter, according to some embodiments of the invention.

Reference is now made to FIG. 3, illustrating a state transition flowchart of the presently disclosed transmitter. According to some embodiments of the invention, the transmitter operates through a sequence of state transitions, enabling controlled signal transmission and real-time parameter adjustments. The process initiates with a starting action, proceeds through parameter selection and activation phases, and concludes with either a deactivation or location pinpointing step.

At step 310, the transmitter is switched on, whereupon the transmitter 100 enters an idle state 301, in which no active transmission occurs.

At step 311, the system transitions to a mode selection state 302, where transmitter 100 parameters are chosen. In this state, the system may configure transmission parameters before activation.

At step 312, the system initiates a scan operation, whereupon the transmitter 100 enters an active state 303. In this state, the transmitter 100 transmits signals based on dynamically updated parameters reflecting previously configured transmission parameters.

At step 313, the scan operation concludes, transitioning the transmitter 100 back to an idle state 304. Furthermore, the transmitter may at this stage perform a localization step 314, enabling it to provide its location to an external device.

Figure 4:
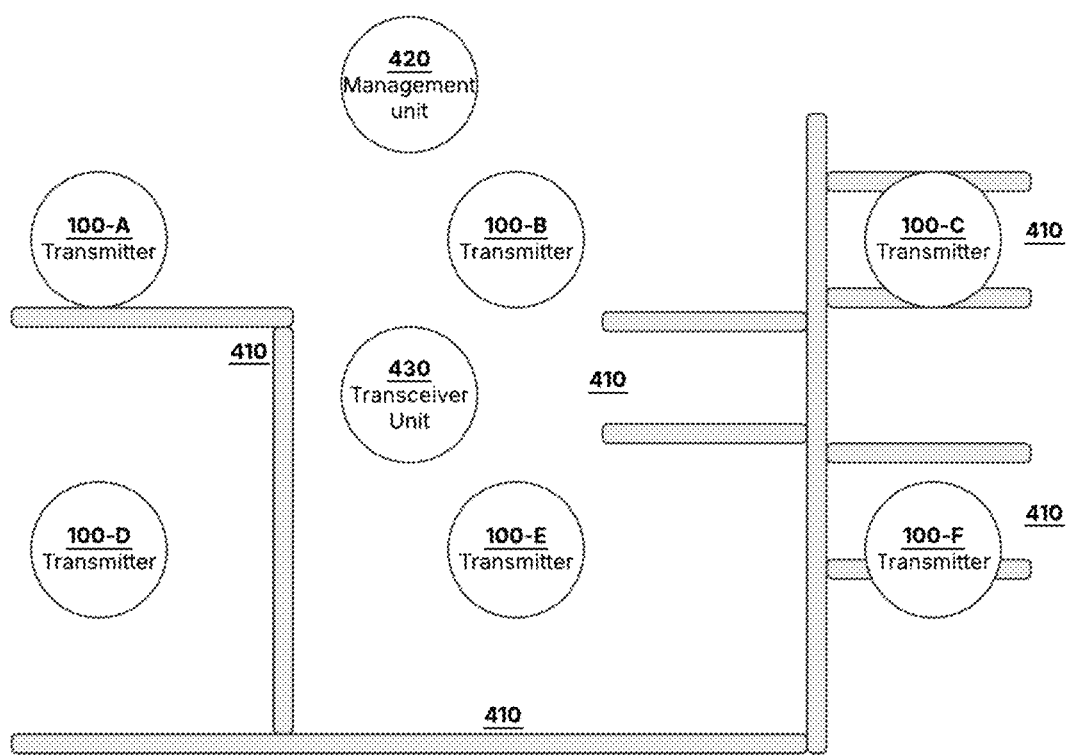
FIG. 4 is a schematic illustration of a multi-transmitter system deployed over an area with an underground utility network, according to some embodiments of the invention.

Reference is now made to FIG. 4, schematically illustrating a multi-transmitter system deployed over an area with an underground utility network 410. The present invention enables precise transmitter differentiation by leveraging software-controlled frequency offsets. According to some embodiments of the invention, the system comprises one or more transmitters 100, a management unit 420, and a transceiver unit 430.

Optionally, the management unit 420 and the transceiver unit 430 may be integrated into a single unified scanning device. The scanning device may be configured as either a stationary unit or a mobile unit.

In an embodiment, the transceiver unit 430 receives and processes signals transmitted 100 by the plurality of transmitter systems, thereby scanning underground utilities comprising the underground utility network 410.

Optionally, the transceiver unit 430 comprises a GNSS receiver, and may utilize the GNSS receiver to acquire information on its location.

Optionally, the transceiver unit 430 comprises a wireless communication device, and wirelessly receives using communication technologies such as RF transmission (e.g., Bluetooth, Wi-Fi, Zigbee, LoRa), optical communication (e.g., infrared, Li-Fi, laser-based signaling), or near-field communication (NFC) from each transmitter 100 in the plurality of transmitters information on its respective location.

In an embodiment, the management unit 420 configures each transmitter 100 in the plurality of transmitters to operate according to a unique plurality of signal parameters, such that each transmitter 100 operates at a measurably different plurality of frequencies. For example, the management unit 420 may wirelessly configure a first transmitter 100-A to operate at 20 kHz, 50 kHz, and 110 kHz, and wirelessly configure a second transmitter 100-B to operate at 20.1 kHz, 50.1 kHz, and 110.1 kHz. Because the precise geolocation of each transmitter is known, the transceiver unit 430 receiving the signals emitted by each transmitter 100 can accurately distinguish their sources. This capability significantly enhances mapping resolution in underground utility tracking, enabling highly precise identification of signal origins and facilitating more accurate infrastructure assessments.

Optionally, the management unit 420 performs cognitive interference mitigation (CIM) by dynamically adjusting a plurality of signal parameters that configure one or more transmitters 100 based on detected interference. CIM employs real-time spectrum analysis to identify interfering signals and assess the signal-to-noise ratio (SNR), spectral occupancy, or power spectral density of the transmission environment. Upon detecting interference above a predefined threshold, CIM modifies one or more transmission parameters to mitigate disruptions. Such adjustments include, but are not limited to: frequency shifting by at least a predefined offset (e.g., ±100 Hz) to avoid overlapping with interfering signals or adaptive power control by reducing transmission power by up to a predefined percentage (e.g., 3 dB) to minimize interference effects.

For the purpose of this disclosure, cognitive interference mitigation refers to any automated or semi-automated process that dynamically adjusts signal transmission parameters based on real-time interference detection methods. CIM may be implemented via software-defined algorithms, machine-learning-based interference classification, or predefined spectrum management rules. This capability enhances signal robustness in congested environments, enabling the system to maintain efficient operation despite external electromagnetic interference.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority documents of this application is/are hereby incorporated herein by reference in its/their entirety.

What is claimed is:

1. A transmitter for underground metal object detection system, comprising:
   one of (1) a high-frequency H-bridge and (2) a pair of high-frequency half H-bridges;
   a transmitting antenna,
   wherein the one of (1) a high-frequency H-bridge and (2) a pair of high-frequency half H-bridges provides an alternating current to the transmitting antenna; and
   a processor configured to perform the following:
      receive a plurality of signal parameters, wherein a signal parameter comprises one or more frequency values and one or more amplitude values;
      generate a high-frequency modulated control signal controlling the one of (1) a high-frequency H-bridge and (2) a pair of high-frequency half H-bridges to produce the alternating current in accordance to the plurality of signal parameters, thereby transmitting a multi-frequency radio signal via the transmitting antenna;
      measure the alternating current to make a determination whether the modulated control signal conforms to the plurality of signal parameters; and
      responsive to determining that the modulated control signal does not conform to the plurality of signal parameters, adjust the plurality of signal parameters.

2. The transmitter according to claim 1, wherein the one of (1) a high-frequency H-bridge and (2) a pair of high-frequency half H-bridges operates at a frequency of 200 kHz to 12 MHz, and the alternating current voltage is in a range of 12 VAC to 1200 VAC.

3. The transmitter according to claim 1, wherein the one of (1) a high-frequency H-bridge and (2) a pair of high-frequency half H-bridges comprises one of:
   a plurality of GaN switching elements; and
   a plurality of silicon carbide switching elements.

4. The transmitter according to claim 1, further comprising:
   a power source; and
   a DC-DC boost converter,
   wherein the power source output is the DC-DC boost converter input,
   wherein the DC-DC boost converter output is the H-bridge input, and
   wherein the processor is further configured to perform the following:
      monitor an input voltage of the DC-DC boost converter; and
      limit power consumption of the system.

5. A system for underground metal object detection, comprising:
   a radio frequency transceiver unit;
   a management unit; and
   a plurality of transmitters according to claim 1,
   wherein the management unit is configured to send to each of the plurality of transmitters a unique plurality of signal parameters, such that all transmitters operate at frequencies at least 1 Hz apart, and wherein the transceiver unit is configured to receive and process signals transmitted by the plurality of transmitters.

6. A system for underground metal object detection, comprising:
   one or more transmitters, each transmitter comprising:
      one of (1) a high-frequency H-bridge and (2) a pair of high-frequency half H-bridges;
      a transmitting antenna,
      wherein the one of (1) a high-frequency H-bridge and (2) a pair of high-frequency half H-bridges provides an alternating current to the transmitting antenna;
      a GNSS receiver; and
      a processor configured to perform the following:
         receive a respective plurality of signal parameters, wherein a signal parameter comprises one or more frequency values and one or more amplitude values;
         generate a high-frequency modulated control signal controlling the one of (1) a high-frequency H-bridge and (2) a pair of high-frequency half H-bridges to produce the alternating current in accordance to the plurality of signal parameters, thereby transmitting a multi-frequency radio signal via the transmitting antenna;
         measure the alternating current to make a determination whether the modulated control signal conforms to the respective plurality of signal parameters; and
         responsive to determining that the modulated control signal does not conform to the respective plurality of signal parameters, adjust the respective plurality of signal parameters; and
   a scanning device, comprising:
      a GNSS receiver;
      a processor configured to perform the following:
         receive a respective GNSS position of each of the one or more transmitters;
         configure a plurality of signal parameters, wherein a signal parameter comprises one or more frequency values and one or more amplitude values.

7. A processor-implemented method for underground metal object detection with a scanning device and one or more transmitters, comprising:
   determining, at the scanning device and at each of the one or more transmitters, a respective GNSS position;
   receiving, at the scanning device, a respective GNSS position of each of the one or more transmitters;
   configuring, at the scanning device, a plurality of signal parameters, wherein a signal parameter comprises one or more frequency values and one or more amplitude values;
   receiving, at each of the one or more transmitters, a respective plurality of signal parameters;
   generating, at each of the one or more transmitters, a high-frequency modulated control signal controlling one of (1) a high-frequency H-bridge and (2) a pair of high-frequency half H-bridges in accordance to the plurality of signal parameters;
   measuring, at each of the one or more transmitters, an alternating current provided by the one of (1) a high-frequency H-bridge and (2) a pair of high-frequency half H-bridges to a transmitting antenna to make a determination whether the modulated control signal conforms to the respective plurality of signal parameters; and
   responsive to determining, at each of the one or more transmitters, that the modulated control signal does not conform to the respective plurality of signal parameters, adjusting the respective plurality of signal parameters.

8. The method according to claim 7, wherein generating the high-frequency modulated control signal comprises generating a multi-frequency continuous wave.

9. The method according to claim 7, further comprising at least one of:
   performing power control of the high-frequency modulated control signal; and
   performing frequency control of the high-frequency modulated control signal.

10. The method according to claim 7, further comprising performing digital pre-distortion of the high-frequency modulated control signal to compensate for transmission non-linearities.

11. The method according to claim 7, further comprising performing cognitive interference mitigation by dynamically adjusting the signal parameters based on detected interference.

12. The method according to claim 7, wherein receiving a plurality of signal parameters comprises receiving input entered by an operator via a user interface.

13. The method according to claim 7, wherein receiving a plurality of signal parameters comprises receiving input via wireless communication means.

* * * * *